(12) United States Patent
Denkmayr

(10) Patent No.: US 7,454,963 B2
(45) Date of Patent: Nov. 25, 2008

(54) METHOD FOR ENSURING THE RELIABILITY OF TECHNICAL COMPONENTS

(75) Inventor: Kláus Denkmayr, Graz (AT)

(73) Assignee: AVL List GmbH, Graz (AT)

( * ) Notice: Subject to any disclaimer, the term of this patent is extended or adjusted under 35 U.S.C. 154(b) by 65 days.

(21) Appl. No.: 10/574,576

(22) PCT Filed: Sep. 30, 2004

(86) PCT No.: PCT/AT2004/000329

§ 371 (c)(1),
(2), (4) Date: Nov. 20, 2006

(87) PCT Pub. No.: WO2005/033649

PCT Pub. Date: Apr. 14, 2005

(65) Prior Publication Data

US 2007/0079651 A1      Apr. 12, 2007

(30) Foreign Application Priority Data

Oct. 9, 2003   (AT) .............................. GM695/2003

(51) Int. Cl.
*G01M 15/00*   (2006.01)

(52) U.S. Cl. .................................................. 73/114.77
(58) Field of Classification Search ............. 73/114.01, 73/114.38, 114.58, 114.77, 114.78, 114.79, 73/114.81, 115.01, 118.01, 118.02
See application file for complete search history.

(56) References Cited

U.S. PATENT DOCUMENTS 6,260,998 B1    7/2001   Garfinkel et al.

OTHER PUBLICATIONS

K. Denkmayr et al., "AVL's Reliability Engineering Process for Engine Development" in IEEE, 2003 Proceedings Annual Reliability and Maintainability Symposium, Jan. 27, 2003, pp. 455-458.
W.Q. Meeker et al., "Reliability: The Other Dimension of Quality" in Online!, Jul. 1, 2003, pp. 1-25.
K. Denkmayr et al., "Die Load-Matrix . . . Dauerlauf" in MTZ Motortechnische Zeitschrift, vol. 64, No. 11, Nov. 2003, pp. 924-930.

*Primary Examiner*—Eric S McCall
(74) *Attorney, Agent, or Firm*—Dykema Gossett PLLC

(57) ABSTRACT

A test program ensures the reliability of technical components, especially of internal combustion engines and the parts thereof, by use of a test program. A method is provided which enables an evaluation of the entire test program. If a reliability target cannot be realized with the chosen test program, a modification of the test program is necessary.

12 Claims, 2 Drawing Sheets

| A | B | C | D | E | F | G |
|---|---|---|---|---|---|---|
| Piston ring | | | Damage mode 1: Wear and tear | | | |
| | Duration | Unit | Acceleration factor | Equiv. km | No. of repetitions | Total equiv. km |
| Endurance runs on test stands | | | | | | |
| Nominal output tests | 500 | h | 5.1 | 140,250 | 4 | 561,000 |
| Thermal shock test | 300 | h | 2.9 | 47,850 | 4 | 191,400 |
| Changing load test | 1,000 | h | 5.9 | 324,500 | 4 | 1,298,000 |
| Piston and cylinder head breakage test | 500 | h | 3.5 | 96,250 | 4 | 385,000 |
| ...... | ... | ... | ... | ... | ... | ... |
| Vehicle endurance runs | | | | | | |
| Motorway test | 100,000 | km | 1.3 | 200,000 | 4 | 800,000 |
| City cycle | 50,000 | km | 1 | 50,000 | 4 | 200,000 |
| High-speed test | 50,000 | km | 3.5 | 175,000 | 4 | 700,000 |
| Customer test | 150,000 | km | 1 | 150,000 | 15 | 2,250,000 |
| ...... | ... | ... | ... | ... | ... | ... |
| | | | Max.: | 324,500 | Sum: | 6,385,400 |

*Fig. 2*

| A | B | C | D | E | F | G | H | I |
|---|---|---|---|---|---|---|---|---|
| Load Matrix Summary Sheet | Degree of change | Load | Risk | Sum total of equivalence km | Reliability after 2 years | Service life risk after [km] | Verifiable reliability | Reliability from running tests |
| Component/ Damage Mode | | | | | | | | |
| Piston ring/wear | 1 | 2 | 2 | 6,385,400 | 0.99990 | 324,500 | 0.989969 | 1.00000 |
| Cylinder head/ Breakage of valve crosspiece | 2 | 2 | 4 | 4,774,000 | 0.9990 | 198,200 | 0.986605 | 1.00000 |
| Cylinder head / seat ring wear | 2 | 2 | 4 | 5,230,000 | 0.99990 | 160,600 | 0.987766 | 1.00000 |
| Connector/ frictional corrosion | 2 | 1 | 2 | 11,942,000 | 0.9995 | 250,600 | 0.994624 | 1.00000 |
| ... | ... | ... | ... | ... | ... | ... | ... | ... |

*Fig. 3*

METHOD FOR ENSURING THE RELIABILITY OF TECHNICAL COMPONENTS

BACKGROUND TO THE INVENTION

1. Field of the Invention

The invention relates to a method for ensuring the reliability of technical components, especially of internal combustion engines and the parts thereof, by means of a test program.

2. The Prior Art

Vehicle owners expect that each new generation of engines offers higher performance, lower fuel consumption and reduced emissions in combination with the highest reliability. At the same time, the vehicle manufacturers urge shorter development periods. In this field of tension, ensuring reliability during the development process is of special importance.

It is known from the publication "Der AVL-Reliability-Engineering-Prozess für die Motor-und Antriebsstrangentwicklung" (The AVL reliability engineering process for the development of engines and drive train), Klaus DENKMAYR, VDI-Berichte 1713, 2002, pages 27 through 32, to illustrate the damage of units, components and modules in a load matrix. Different engine properties can be tested by means of test programs, especially different endurance test runs, with different engine subsystems being loaded in highly different ways. For example, in a thermal shock test the cylinder head is highly loaded, whereas the crankshaft is loaded to a lesser extent. In order to outline the different loads and discover possible weak points in the test program, the so-called load matrix was introduced in this publication. The load matrix states the amount to which the respective endurance run of the subsystems provides a load in comparison with the typical use during the normal service life.

The $B_{10}$ service life is usually used as the reliability index for internal combustion engines, which service life states the running output until 10% of the total population of a group of engines shows a serious defect. Depending on the application, the $B_{10}$ value is stated in kilometers, miles or hours of operation.

A further important reliability parameter is the so-called repair frequency which states the frequency of defects of components or modules per year of warranty. The reliability parameters of $B_{10}$ service life and repair frequency have a relevant influence on the costs by warranty and gratuitous services for the makers of engines and vehicles. Shorter development periods, harder utilization profiles and rising warranty and accommodation periods lead to the consequence that ensuring reliability in components and modules is rising in importance.

SUMMARY OF THE INVENTION

It is the object of the present invention to generate a test program which allows ensuring the reliability of components and/or modules and complete units such as internal combustion engines in the simplest possible, but sufficiently comprehensive way. The method is further used for developing an evaluation of the reliability of technical components and/or modules with which the most reliable evaluation of future cost risks is possible.

This is achieved in accordance with the invention by the following steps:

a) Selection of at least one critical component and at least one critical damage mode;

b) Definition of a reliability goal for each critical component;

c) Selection of at least one test procedure for each critical component;

d) Allocation of a test duration and/or test length for each test procedure;

e) Allocation of acceleration factors in connection with the individual components and test procedures;

f) Determination of an equivalent test duration and/or test length for the critical component and the respective test by means of acceleration factors and test duration or test length;

g) Calculation of the verifiable reliability for the critical component on the basis of the chosen test procedure.

The acceleration factors can be determined by estimation or empirically for at least a first approximation. A substantially more precise statement can be obtained however when according to a preferred embodiment of the invention (within the step e) the acceleration factors are determined on the basis of deterioration models. In tests under aggravated conditions such as increased mechanical or thermal loads, damaging that occurs after a specific test duration is compared with such a duration at which damaging occurs in practical operation. Deterioration models are prepared from this information for critical components and deterioration modes. Conversely, new tests can also be defined from known deterioration models.

The equivalent test duration or test length provides a reference quantity for evaluating the usefulness of the chosen test procedure. The following additional steps can be provided subsequently:

h) Comparison of the verifiable reliability with the reliability goal;

i) Modification of the test program when verifiable reliability departs from the reliability goal and the departure is larger than a predefined tolerance quantity.

At least one test procedure is modified when the verifiable reliability lies beneath the reliability goal. The tolerance value can also be zero here.

A modification of the test program will become necessary when the verifiable reliability is insufficient or when there is also unnecessarily long or excessive testing. In the first case, the verifiable reliability can be increased by changing the test procedures, the test duration or the acceleration factors. In the second case, the test duration can be shortened or tests can be omitted.

As an alternative or in addition to the steps h to I, the following steps can be carried out for ensuring the reliability of the components:

j) Comparison of the equivalent test duration and/or test length with the service life goal;

k) Modification of the test program when the verifiable equivalent test duration and/or test length departs from the service life goal and the departure is larger than a predetermined tolerance value.

At least one test procedure can be modified when the equivalent test duration and/or test length lies beneath the service life goal. The tolerance value can also be zero or unequal zero.

If the verifiable equivalent test duration or test length should be substantially larger than the service life goal, the amount of testing may be reduced by shortening or even omitting individual test procedures. If the equivalent test duration or test length does not reach the service life goal, the tests need to be made more stringent. This can be made for example by increasing the mechanical or thermal loads on the component during the test (and thus the acceleration factors) or by increasing the test duration.

At least the steps c) through g), h) and i) and/or j) and k) can be repeated until the verifiable reliability corresponds at least to the reliability goal.

When the reliability goal cannot be ensured by endurance run tests, additional component tests or FE tests (Finite Element tests) can be performed alternatively.

The results of the individual tests are represented advantageously as load matrix for the individual components and/or saved to a database, with the cells of the load matrix preferably being the individual critical components and damage modes.

Durability and failure risk of components and modules can thus be evaluated in a sufficiently precise manner and future warranty costs can be calculated.

The actual testing of the critical components occurs after ensuring the reliability.

The invention is explained below in closer detail by reference to the drawings.

BRIEF DESCRIPTION OF THE DRAWINGS

FIG. 2 shows a sheet with the details for piston ring wearing, and

FIG. 3 shows a summary sheet of an embodiment of the invention.

DETAILED DESCRIPTION OF THE PREFERRED EMBODIMENT

Figure 1:
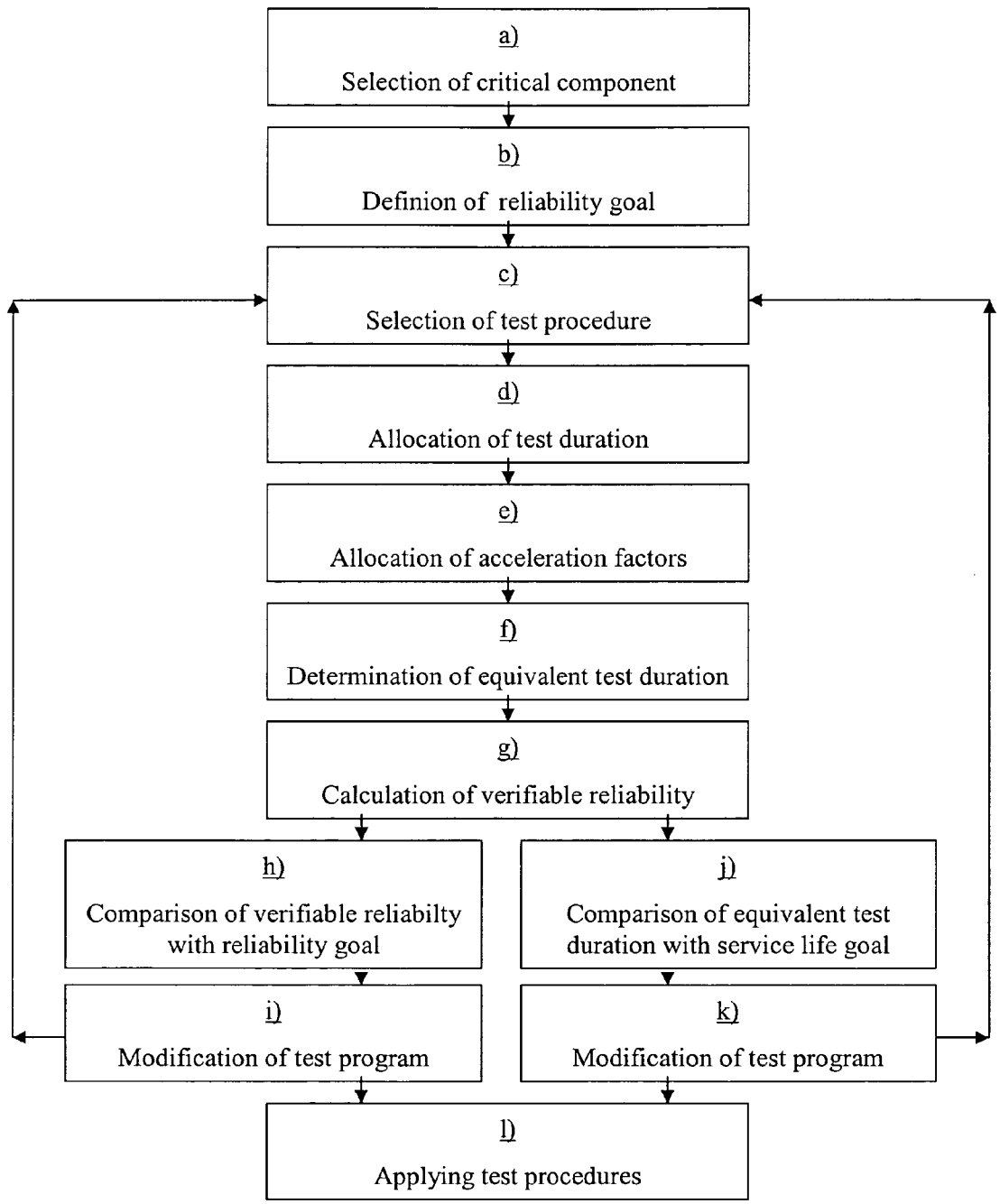
FIG. 1 shows a block diagram with the method steps in accordance with the invention.

FIG. 1 illustrates the process of preparing the load matrix. It is appropriate for reasons of efficiency to limit oneself to critical components. The selection of these components and damage modes occurs in a first method step a) within the scope of a so-called FMEA (Failure Mode and Effects Analysis) by taking into account existing field data of comparable components. In the next step b) there is a determination of the reliability goals (error rate) for a predetermined period of use (e.g. warranty period). Then, in step c), the respective test procedures for each critical component are chosen and allocated in step d) to the test duration or test length of each test procedure.

Acceleration factors and test repetition numbers are allocated in step e) to the individual components and test procedures. Deterioration models are prepared for determining the acceleration factors. The duration until the occurrence of a certain damage is determined for use in practical operation and tests. New tests can be defined in the case of known deterioration models. The acceleration factors can be determined by comparing the duration until damaging from practical operation and the tests.

The tests (test stand and vehicle) are compiled in the so-called detail sheets of the load matrix for the examined components.

An equivalent test duration and/or test length is calculated for the critical component by means of the acceleration factors, the test repetition numbers and the test duration and/or test length (step f). A verifiable reliability is determined for the critical component in step g) on the basis of the chosen test procedure.

By comparing the verifiable reliability with the reliability goal (step h) and/or by comparing the equivalent test duration with the service life goal (step j) it is possible to make statements on the quality of the test program or the chosen test procedure. If the reliability goal or the service life goal is not reached, the test program or at least one test procedure is modified in step i) and k) until the reliability goal or the test duration and/or test length goal has been achieved. The steps c) to i) or c) to h), j) and k) are repeated respectively frequently for this purpose. The test procedures can then be applied in step l) by using statistical reliability methods in practice.

FIGS. 2 and 3 show a load matrix as an example for a passenger car engine. It consists of a summary sheet (FIG. 3) and a number of detail sheets for critical components and relevant damage modes. Each detail sheet combines all relevant information on a component (see FIG. 2).

In the detail sheet as shown as an example in FIG. 2, column A contains the planned tests for the critical component "piston ring" for the damage mode "wear and tear". Exemplary test procedures chosen are nominal output test, thermal shock test, changing load test, piston and cylinder head breakage test within the endurance runs on the test stand, as well as motorway test, city cycle, high-speed test and customer test within the vehicle endurance runs. Columns B and C show the test duration and units (hours, kilometers, etc.). Column D shows the acceleration factor relating to a standardized load profile. This acceleration factor is stated especially for the respective underlying test, critical component and damage mode. The equivalence kilometers are calculated from the runtime of the test and the acceleration factor (column E, which is the damage-equivalent number of kilometers in the standardized load collective). Column F states the number of tests and column G the sum total of the equivalence kilometers by taking the repetitions into account. The detail sheet further states the sum total of all driven equivalence kilometers and the equivalence kilometer maximum. If more than one damage mode is relevant, further blocks of columns are prepared in the detail sheet in analogy to D through G and the respective evaluations (sum, maximum) are performed.

The load matrix summary sheet (FIG. 3) contains a summary of all relevant information from the detail sheets and evaluations for the evaluation and optimization of the test program. Column A lists the critical components and the relevant damage modes. The example shows the component "piston ring" with the damage mode "wear and tear" of FIG. 2 and the component "cylinder head" with the damage mode "breakage of valve crosspiece" and "seat ring wearing" and, as an example for an electric component, the component "connector" (electric connection coupling) with the damage mode "frictional corrosion". In the case of a further development of an internal combustion engine or an upgrade, a grading at the component level is made. Columns B and C state the degree of innovation and the load level. In column B, "1" designates an unchanged component, "2" a slightly modified component and "3" a completely new component. An analogous evaluation is used for the load level: "1" stands for an equal or lower load, "2" for a slightly increased load and "3" for a substantially higher load of the component or in the case that no comparison is possible because there is a new component. Column D shows the product of degree of innovation and load level as a risk priority number. Column E states the sum totals of the equivalence kilometers as carryovers of the detail sheets for the examined components and the damage mode. Column F states the reliability goal values: reliability goal 0.99990 means for example that ten components of 100,000 have a serious defect.

One central point is the identification of risks at high running time. It is calculated in the summary sheet of the load matrix in column G up to which running output the test is performed at a maximum. The values are obtained from the maximum equivalence kilometers of column E of the detail sheets (FIG. 2). If this value for a critical component and a damage mode is far away from the service life goal, a risk is thus indicated that a problem only occurring at high running output may not be recognized in the test procedure under certain circumstances. At a service life goal of 250,000 km for example, the equivalence kilometers of 160,600 as determined from the test procedures would be too low for the component "cylinder head" with the damage mode "seat ring wearing", so that it is not possible to ensure with the chosen test procedure that the service life goal will actually be achieved. In this case, an increase of the duration of the test procedure or modification of the test procedure for increasing the acceleration factor could provide an improvement of the informative value of the test.

Column H shows the reliability which can be proven with the present test program and the predetermined confidence level in the ideal case, which means that no defects occur during the tests. A constant failure rate is assumed in the example in an approximating manner. The calculation of the verifiable reliability is based on the following context known from literature:

$$1-C=R_{Test}^n \qquad (1)$$

with n being the number of tests, 1−C the confidence level (e.g. 0.9 for 90%) and $R_{test}$ the reliability to be proven (e.g. 0.9999). It is assumed here that during the tests on the examined component there will not be any damage on the same.

The following formula applies in the case that there are one or several occurrences of damage on the component:

$$1 - C = \sum_{i=0}^{f} \frac{n!}{i!(n-i)!} \cdot (1 - R_{test})^i \cdot R_{test}^{(n-i)}, \qquad (2)$$

with f designating the number of the maximum "permitted" defects.

The summary sheet of the load matrix also represents an ideal basic structure in order to build up reliability evaluations in a closed manner. In column I, the current error rate is calculated from the running test program, with the runtimes being weighted with the component-specific acceleration factors.

Based on the load matrix, the warranty costs could be evaluated by taking into account the assumed average repair costs per case.

The final evaluation of the entire test program on the basis of the load matrix is of central relevance. The following optimization steps are the possible consequences: adjustment of individual test lengths (shortening or extension), amendment by additional tests or adjustment of the number of repetitions, modification of existing test procedures.

The claims filed with the application are definition proposals without prejudice to achieving further-reaching patent protection. The applicant reserves the right to claim further features which until now were only disclosed in the description and/or the drawings.

References back as used in the sub-claims refer to the further arrangement of the subject matter of the main claim by features of the respective sub-claim; they shall not be understood as a waiver to achieving independent generic protection for the features of the sub-claims which refer back.

The subject matters of said sub-claims also form independent inventions which have a configuration which is independent of the subject matters of the preceding sub-claims.

The invention is not limited to the embodiment(s) of the description. Numerous changes and modifications are possible within the scope of the invention, especially such variants, elements and combinations and/or materials which are inventive for example by combination or modification of individual features or elements or method steps as described in the general description and embodiments and claims and contained in the drawings, and which by combined features lead to a new subject matter or new method steps or sequences of method steps, insofar as they also relate to production, testing and working methods.

The invention claimed is:

1. A method for ensuring the reliability of technical components, especially of internal combustion engines and the parts thereof, by means of a test program, comprising the following steps:
 a) selection of at least one critical component and at least one critical damage mode;
 b) definition of a reliability target goal for each critical component;
 c) selection of at least one test procedure for each critical component;
 d) allocation of a test duration and/or test length for each test procedure;
 e) allocation of acceleration factors in connection with the individual components and test procedures;
 f) determination of an equivalent test duration and/or test length for the critical component and the respective test by means of acceleration factors and test duration or test length;
 g) calculation of the verifiable reliability for the critical component on the basis of the chosen test procedure;
 h) comparison of the verifiable reliability with the reliability target; and
 i) modification of the test program when verifiable reliability deviates from the reliability target and the departure is larger than a predefined tolerance quantity.

2. A method especially according to claim 1, wherein at least one test procedure is modified when the verifiable reliability is smaller than the reliability goal.

3. A method especially according to claim 1 wherein the steps c) through i) are repeated until the verifiable reliability corresponds at least to the reliability target.

4. A method especially according to claim 1, wherein the results of the individual tests are represented as a load matrix for the individual components or are saved to a database.

5. A method especially according to claim 1, wherein deterioration models are prepared for the critical components and damaging modes, and the acceleration factors are prepared on the basis of the deterioration models.

6. A method especially according to claim 5, wherein the preparation of the deterioration models contains the step of comparing the duration until the occurrence of a damaging in practical use with the duration until the occurrence of the same damaging in the test.

7. A method for ensuring the reliability of technical components, especially of internal combustion engines and the parts thereof, by means of a test program, comprising the following steps:
 a) selection of at least one critical component and at least one critical damage mode;
 b) definition of a service life target for each critical component;
 c) selection of at least one test procedure for each critical component;
 d) allocation of a test duration and/or test length for each test procedure;

e) allocation of acceleration factors in connection with the individual components and test procedures;

f) determination of an equivalent test duration and/or test length for the critical component and the respective test by means of acceleration factors and test duration or test length;

g) comparison of the equivalent test duration and/or test length with the service life target; and h) modification of the test program when verifiable equivalent test duration and/or test length departs from the service life target and the departure is larger than a predefined tolerance quantity.

8. A method especially according to claim 7, wherein at least one test procedure is modified when the equivalent test duration and/or test length is smaller than the service life target.

9. A method especially according to claim 7, wherein at least the steps c) to h) are repeated until the equivalent test duration and/or test length corresponds at least to the service life target.

10. A method according to claim 7, wherein the results of the individual tests are represented as a load matrix for the individual components or are saved to a database.

11. A method according to claim 7, wherein deterioration models are prepared for the critical components and damaging modes, and the acceleration factors are prepared on the basis of the deterioration models.

12. A method according to claim 11, wherein the preparation of the deterioration models contains the step of comparing the duration until the occurrence of a damaging in practical use with the duration until the occurrence of the same damaging in the test.

* * * * *